United States Patent
Zhu

(10) Patent No.: US 12,123,984 B2
(45) Date of Patent: Oct. 22, 2024

(54) POINT CLOUDS BASED LIDAR RECALIBRATION SYSTEM FOR AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 974 days.

(21) Appl. No.: 16/918,272

(22) Filed: Jul. 1, 2020

(65) Prior Publication Data

US 2022/0003855 A1   Jan. 6, 2022

(51) Int. Cl.
   *G01S 7/497*   (2006.01)
   *G01S 7/48*   (2006.01)
   *G01S 7/4914*   (2020.01)
   *G01S 17/87*   (2020.01)
   *G01S 17/931*   (2020.01)

(52) U.S. Cl.
   CPC .......... *G01S 7/4972* (2013.01); *G01S 7/4808* (2013.01); *G01S 7/4914* (2013.01); *G01S 17/87* (2013.01); *G01S 17/931* (2020.01)

(58) Field of Classification Search
   None
   See application file for complete search history.

(56) References Cited

U.S. PATENT DOCUMENTS

| | | | |
|---|---|---|---|
| 9,369,689 B1 * | 6/2016 | Tran | H04N 13/239 |
| 11,131,753 B2 * | 9/2021 | Banerjee | G01S 7/497 |
| 11,415,686 B2 * | 8/2022 | Piatek | G01S 17/10 |
| 2008/0094643 A1 * | 4/2008 | Nishio | G01B 11/026 356/623 |
| 2017/0371348 A1 * | 12/2017 | Mou | G01S 17/89 |
| 2018/0188742 A1 | 7/2018 | Wheeler | |

(Continued)

FOREIGN PATENT DOCUMENTS

CN   110532582 A   * 12/2019   .......... G01S 17/006

OTHER PUBLICATIONS

Machine Translation of CN-110532582-A (Year: 2019).*

(Continued)

*Primary Examiner* — Luke D Ratcliffe
(74) *Attorney, Agent, or Firm* — WOMBLE BOND DICKINSON (US) LLP

(57) ABSTRACT

Embodiments of the present disclosures disclose a method and a system to notify an operator that perception sensors of an autonomous driving vehicle (ADV) need to be recalibrated. In one embodiment, a system perceives a surrounding environment of an autonomous driving vehicle (ADV), including one or more obstacles. The system extracts feature information from previously stored point clouds mapping a three-dimensional surrounding environment of the ADV. The system identifies one or more matching features between the extracted feature information and features of the one or more obstacles. The system determines an average offset distance based on each of the matching features. The system determines an average offset distance distribution based on the average offset distance over a period of time. The system sends an alert to the ADV to alert that the one or more sensors is recommended for recalibration if the average offset distance distribution satisfies a predetermined condition.

20 Claims, 11 Drawing Sheets

(56) References Cited

U.S. PATENT DOCUMENTS

| | | | |
|---|---|---|---|
| 2019/0226853 A1* | 7/2019 | Kubiak | G01S 13/426 |
| 2019/0317509 A1 | 10/2019 | Zhang et al. | |
| 2019/0353784 A1* | 11/2019 | Toledano | G05D 1/0212 |
| 2020/0018852 A1* | 1/2020 | Walls | G06T 7/50 |
| 2020/0018854 A1* | 1/2020 | Hicks | G01S 7/487 |
| 2020/0041623 A1* | 2/2020 | Keyetieu | G01S 7/4972 |
| 2020/0226790 A1* | 7/2020 | Alvarez | G01S 13/931 |
| 2021/0158079 A1* | 5/2021 | Aliamiri | G01S 17/86 |
| 2021/0287035 A1* | 9/2021 | Deegan | G01S 7/4972 |

OTHER PUBLICATIONS

McLeod, Saul, "What are Confidence Intervals in Statistics?", Jun. 10, 2019, Simply Scholar Ltd (Year: 2019).*

The Editors of Encyclopaedia Britannica, "Vector", May 27, 2020, Encyclopaedia Britannica (Year: 2020).*

Proof of prior public availability for the above article, 2020 (Year: 2020).*

The Editors of Encyclopaedia Britannica, "Vector Analysis", Jul. 20, 1998, Encyclopaedia Britannica (Year: 1998).*

Proof of prior public availability for the above article, 1998 (Year: 1998).*

Vijay, John et al., "Automatic Calibration and Registration of Lidar and Stereo Camera without Calibration Objects", Nov. 5-7, 2015, IEEE (Year: 2015).*

"The Scot who took The Beatles' Abbey Road photo", Aug. 8, 2019, BBC News (Year: 2019).*

Annotated proof that the above article meets certain Claim limitations (Year: 2019).*

Takeuchi, Blind Area Traffic Prediction using High Definition Maps and LiDAR for for Safe Diving Assist, IEEE 18th International Conference Intelligent Transportation System, 2015, 2311-2316, Nagoya University, Japan.

* cited by examiner

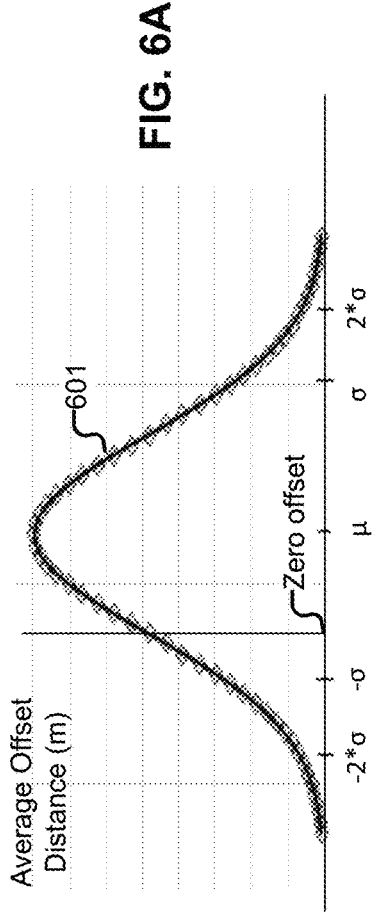
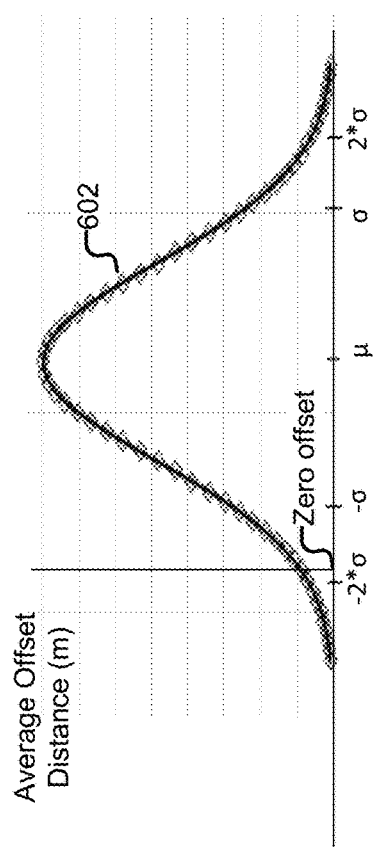
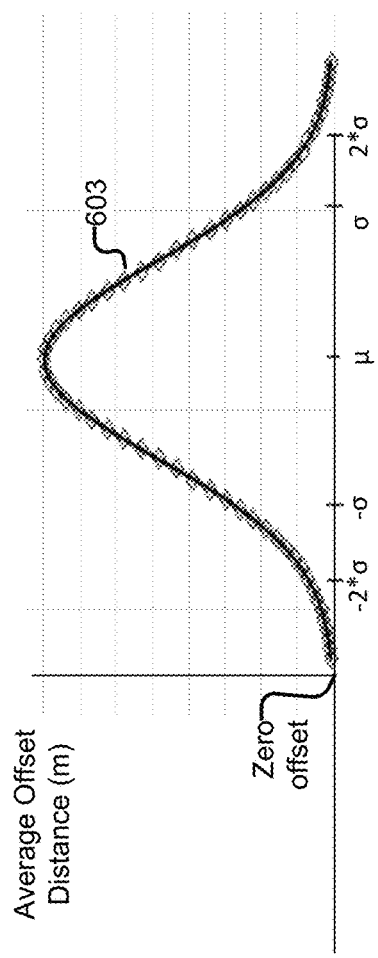

POINT CLOUDS BASED LIDAR RECALIBRATION SYSTEM FOR AUTONOMOUS VEHICLES

TECHNICAL FIELD

Embodiments of the present disclosure relate generally to operating autonomous driving vehicles. More particularly, embodiments of the disclosure relate to a point clouds-based light detection ranging (LIDAR) recalibration system for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Perception and prediction are critical operations in autonomous driving. Perception allows an ADV to sense its environment. A perception system of an ADV typically includes cameras, LIDAR, RADAR, sensors, inertial measurement unit (IMU), etc. These sensors/devices need to be calibrated in order to achieve a high perception accuracy. Sometimes the devices/sensors require recalibration, such as when an operator cleans and/or reinstalls/replaces the sensors for maintenance.

BRIEF DESCRIPTION OF THE DRAWINGS

Embodiments of the disclosure are illustrated by way of example and not limitation in the figures of the accompanying drawings in which like references indicate similar elements.

FIG. 6A is an example probability density function illustrating an average offset distance distribution according to one embodiment.

FIG. 6B is an example probability density function illustrating an average offset distance distribution that triggers a recalibration recommendation alert according to one embodiment.

FIG. 6C is an example probability density function illustrating an average offset distance distribution that triggers a recalibration requirement alert according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the present disclosures disclose a method and a system to notify and/or to recalibrate perception sensors of an autonomous driving vehicle (ADV). In one embodiment, a system perceives a surrounding environment of an autonomous driving vehicle (ADV) using one or more sensors, the surrounding environment including one or more obstacles. The system extracts feature information from previously stored point clouds mapping a three-dimensional surrounding environment of the ADV. The system identifies one or more matching features between the extracted feature information and features of the one or more obstacles. The system determines an average offset distance based on each of the matching features for a planning cycle. The system determines an average offset distance distribution based on the average offset distance for a predetermined number of planning cycles. The system may send an alert to the ADV to alert that the one or more sensors is recommended or requires a recalibration if the average offset distance distribution satisfies a predetermined condition.

Figure 1:
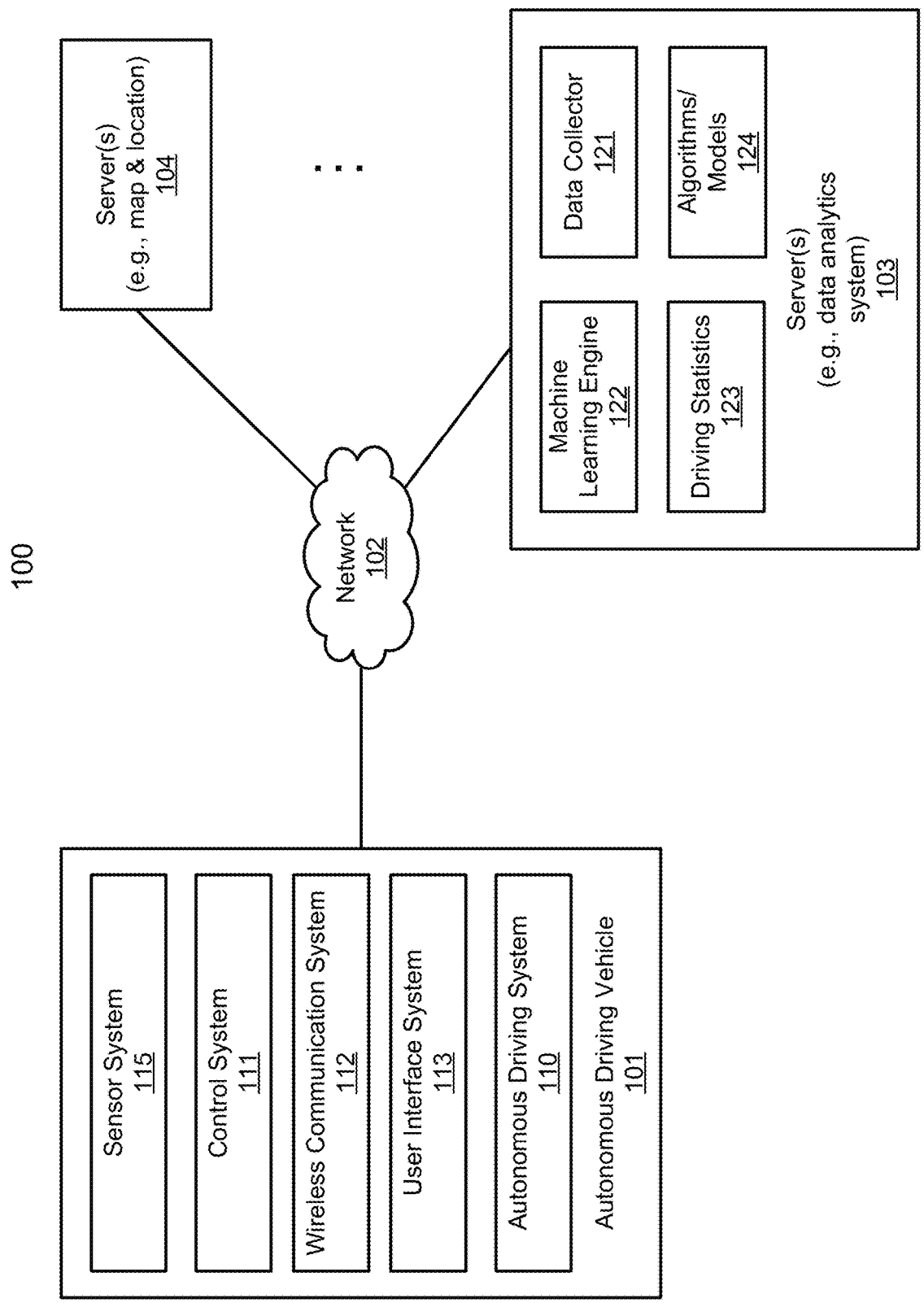
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
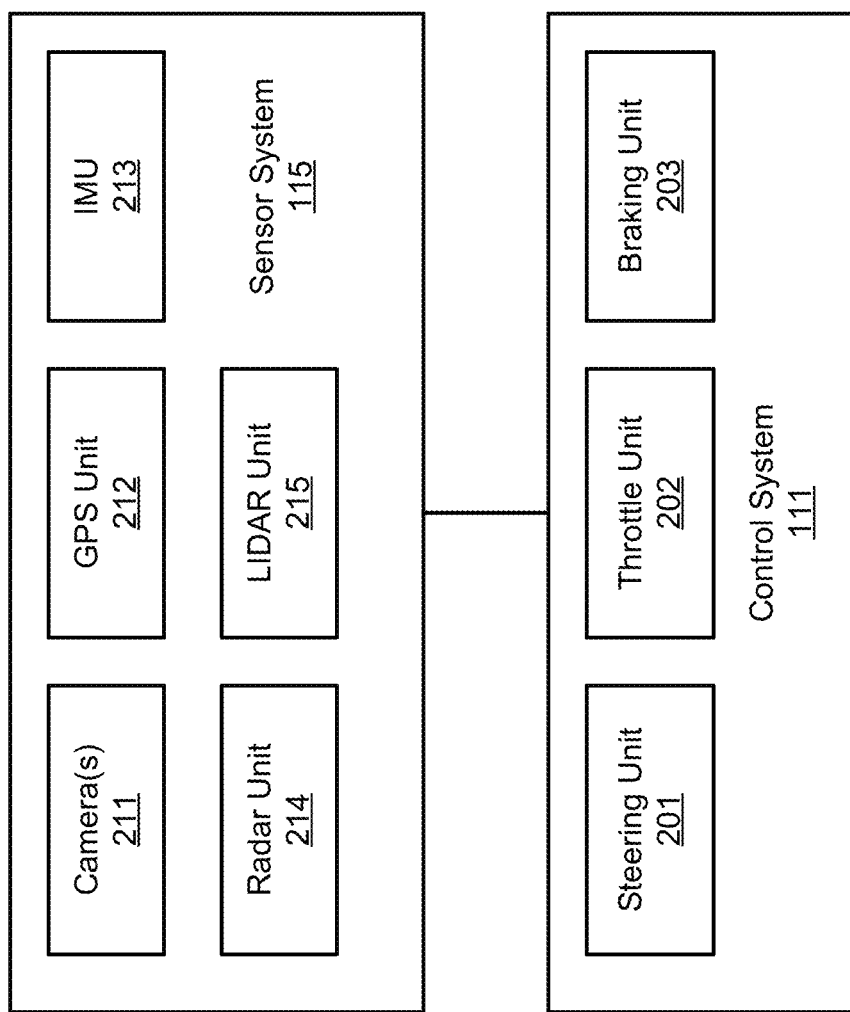
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms for obstacles detection, classification, features extraction, etc.

Algorithms 124 can include algorithms to detect obstacles based on images of a perception system of the ADV. Algorithms 124 can include algorithms to classify objects as static elements (e.g., landmarks, buildings, light posts, traffic signs/lights, tree, etc.) and/or dynamic elements (e.g., vehicles, pedestrians, etc.). Algorithms 124 can include algorithms to extract feature information from the detected obstacles. Algorithms 124 can then be uploaded on ADVs to be utilized during autonomous driving in real-time.

Figure 3A:
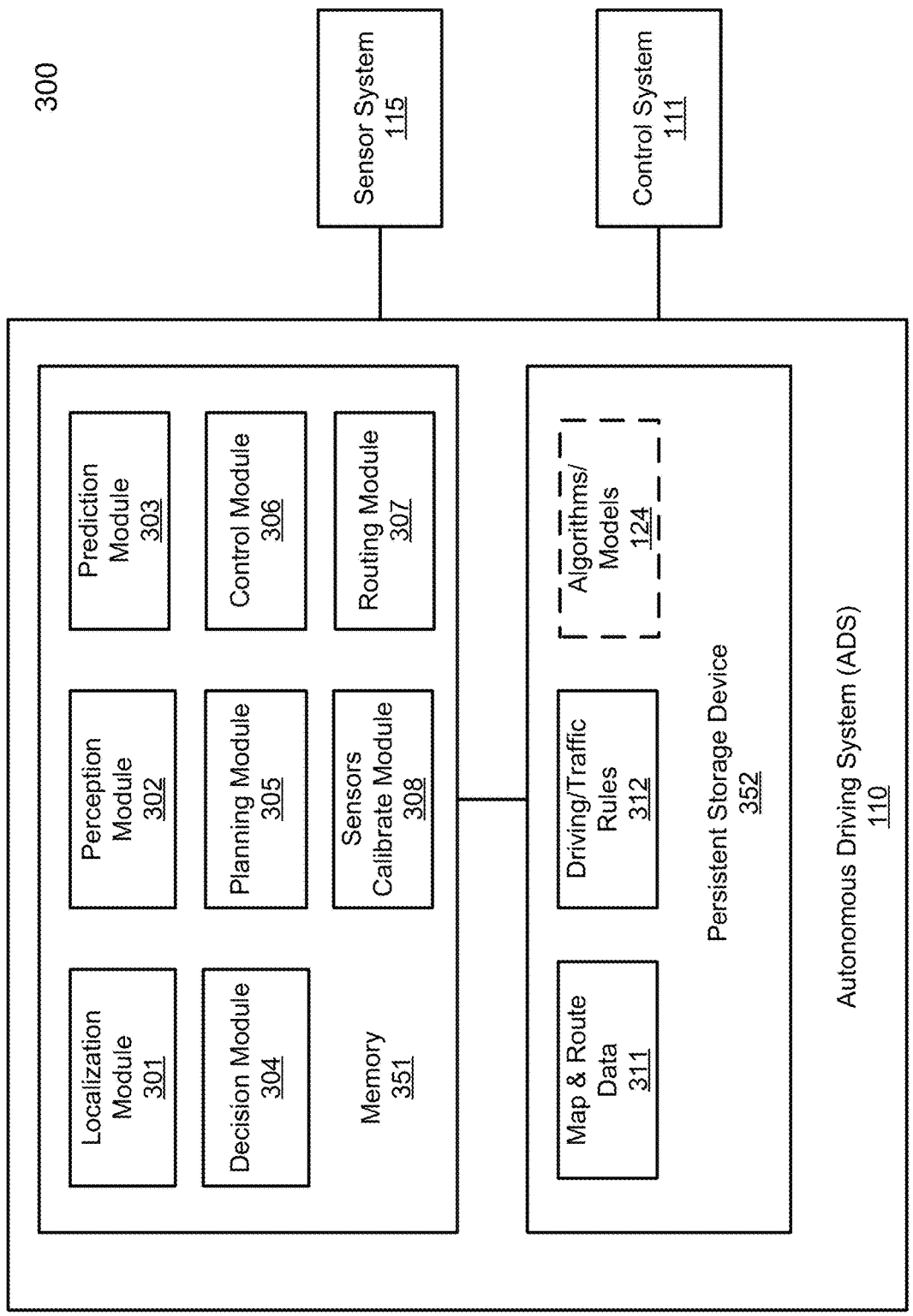
FIGS. 3A-3B are block diagrams illustrating an example of an autonomous driving system used with an autonomous driving vehicle according to one embodiment.
Figure 3B:
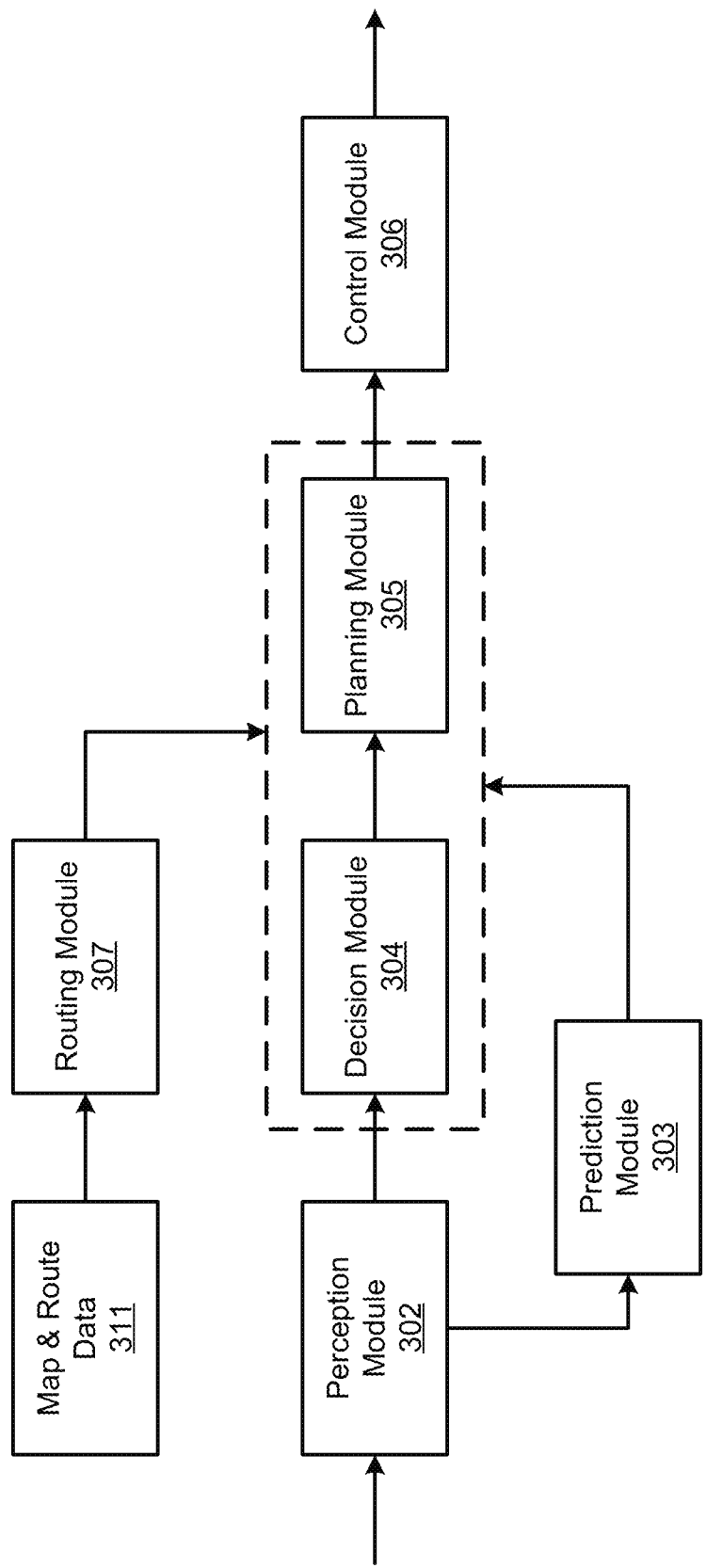

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and sensors calibrate module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, module 308 may be implemented as a part of perception module 302.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition.

That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
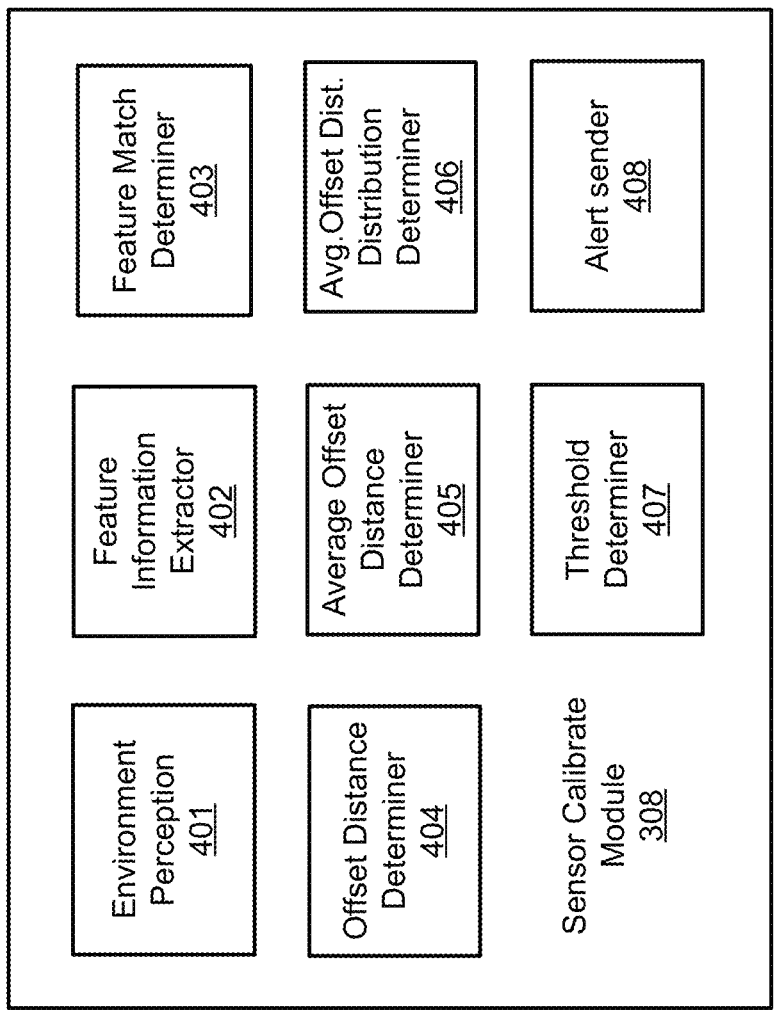
FIG. 4 is a block diagram illustrating a sensors calibrate module according to one embodiment.

FIG. 4 is a block diagram illustrating an example of a sensors calibrate module according to one embodiment. Sensors calibrate module 308 may be implemented as part of perception module of FIG. 3A. Sensors calibrate module 308 can determine and/or notify an operator if any perception sensors require recalibration. Referring to FIG. 4, sensors calibrate module 308 may include submodules such as environment perception 401, feature information extractor 402, feature match determiner 403, offset distance determiner 404, average offset distance determiner 405, offset distance distribution determiner 406, threshold determiner 407, and alert sender 408. Note that some of these modules may be integrated into fewer modules or a single module.

Environment perception 401 can perceive an environment surrounding the ADV. The environment may be perceived by various sensors/image capturing devices of the ADV, including RGB camera(s), LIDAR, RADAR, time-of-flight camera(s), etc. mounted for the ADV, capturing three-dimensional environment information of a surrounding of the ADV. Feature information extractor 402 can extract feature information from previously stored three-dimensional (3D) environment information. The previously stored 3D environment information may be point clouds/RGB images/depth images, or a combination thereof, etc. Here, the 3D environment information can be previously captured by various sensors of ADV 101 and/or other ADVs. The extracted feature information from the previously stored 3D environment information can be used by ADV 101 to match features perceived by a perception system of ADV 101.

Feature match determiner 403 can determine if there is a matching feature/obstacle between an image currently captured by ADV 101 and a retrieved image (RGB image, point clouds map, etc.) previously capture by ADV 101 and/or other ADVs with calibrated sensors. Offset distance determiner 404 can determine an offset distance for a particular matching feature/obstacle. Average offset distance determiner 405 can calculate an average of the offset distance based on all matching features/obstacles of an image frame (or a planning cycle). Here, an image frame can be captured per planning cycle (approximately one frame every 100 milliseconds). Average offset distance distribution determiner 406 can determine an average offset distance distribution based on the average offset distance for a predetermined time span. Thresholds determiner 407 can determine one or more thresholds where a mean of the average offset distance distribution deviates from a zero offset triggers a recalibration alert/notification. Alert (notification) sender 408 can send a notification from module 308 to the ADV 101 to notify an operator that a sensor recalibration is recommended and/or required.

Figure 5A:
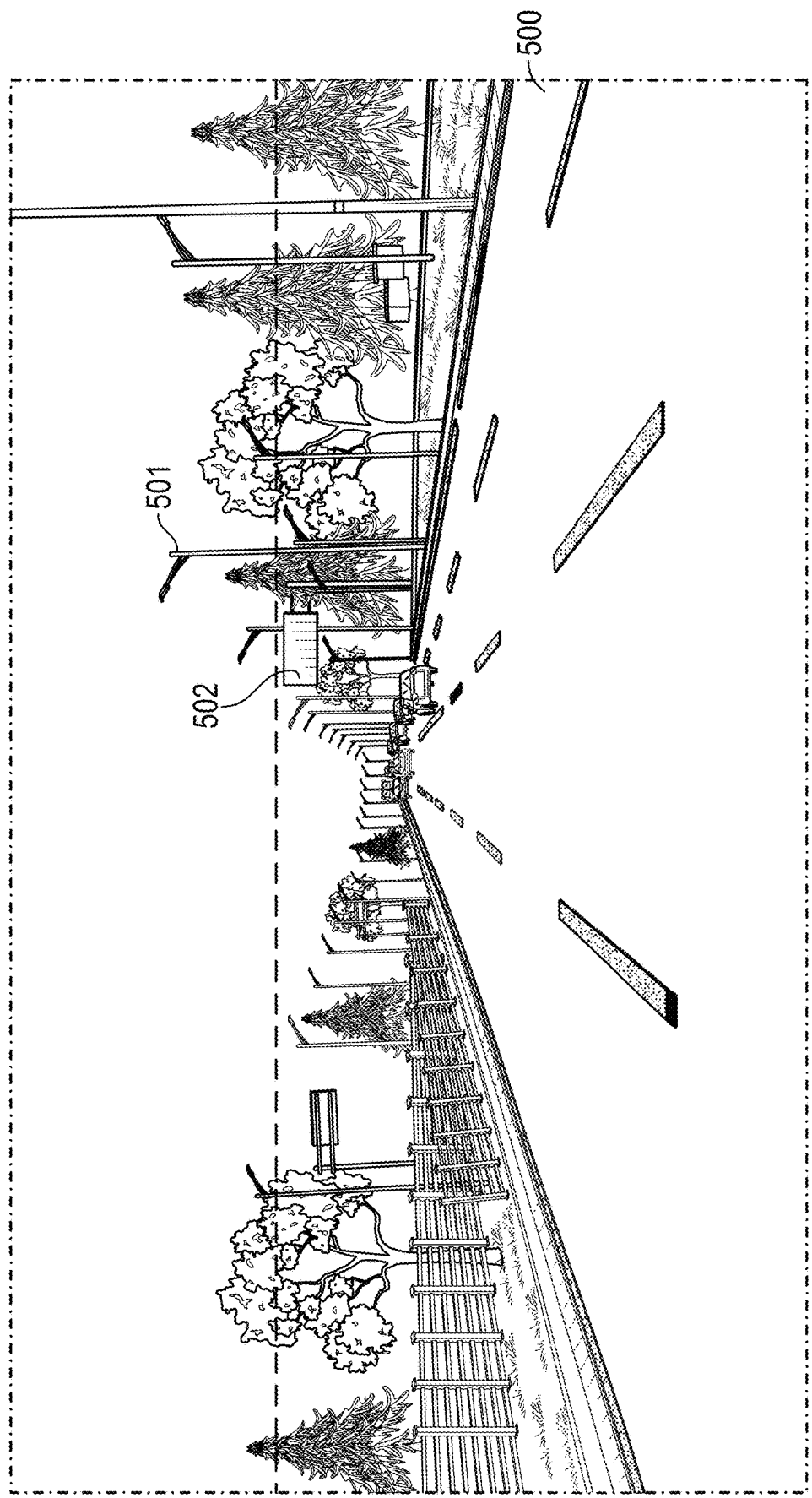
FIG. 5A illustrates a perception of an ADV according to one embodiment.
Figure 5B:
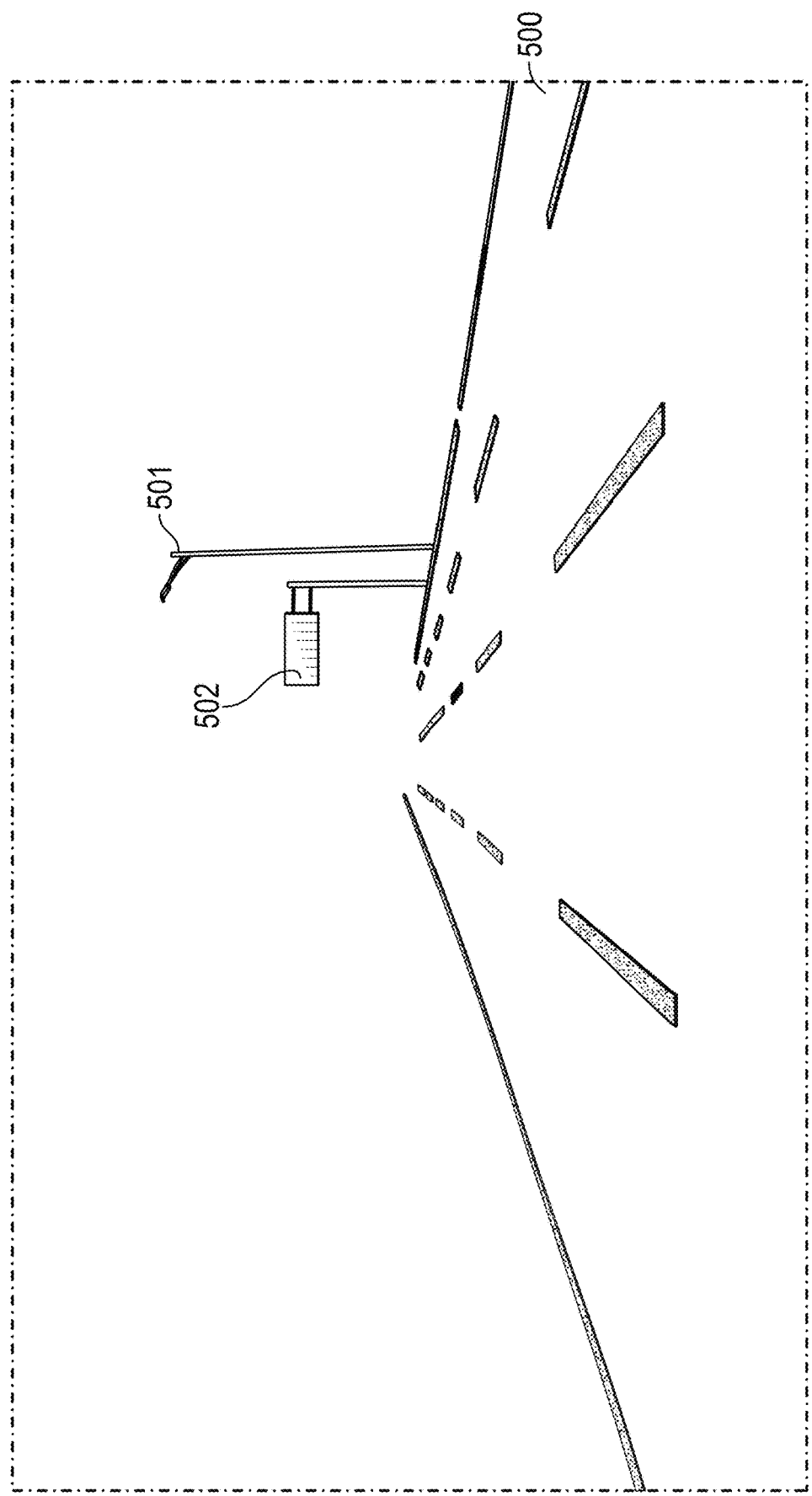
FIG. 5B is an image illustrating some feature information corresponding to the perception of the ADV in FIG. 5A according to one embodiment.
Figure 5C:
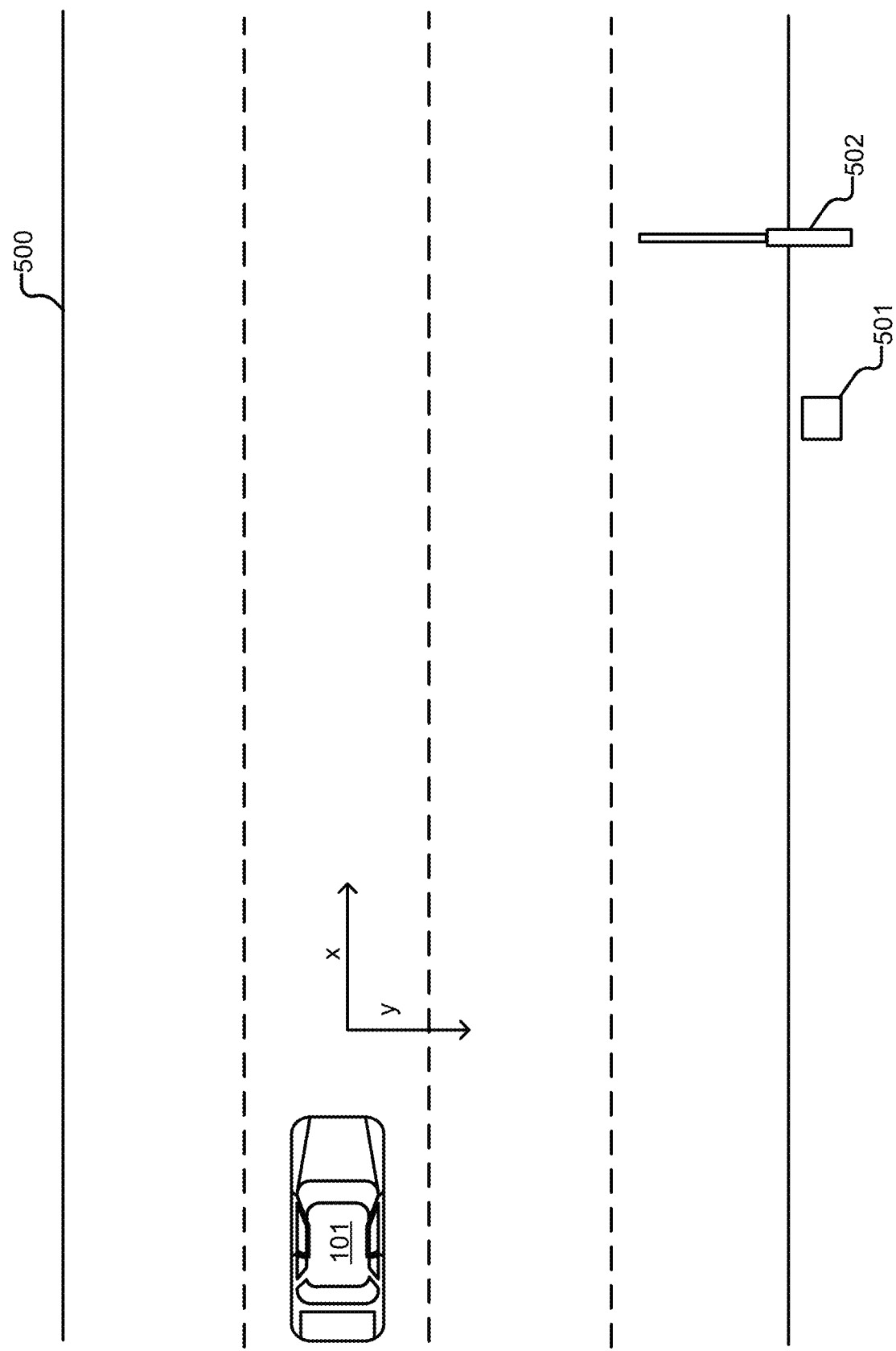
FIG. 5C is a top-down view for FIGS. 5A-5B according to one embodiment.

FIG. 5A illustrates a perception of an ADV according to one embodiment. FIG. 5B is an image illustrating some feature information corresponding to the perception of the ADV in FIG. 5A. FIG. 5C is a top-down view for FIGS. 5A-5B. Referring to FIGS. 5A-5C, for one example, ADV 101 (not shown in FIGS. 5A-5B) may be travelling along roadway 500 with two distinguishable obstacles 501-502. ADV 101 can include one or more perception sensors including RGB cameras, LIDAR, RADAR, time-of-flight (ToF) cameras, or a combination thereof, etc. In one embodiment, ADV 101 perceives a surrounding environment by capturing red-green-blue (RGB) images from a RGB camera, ToF images from a ToF camera, and/or point clouds from a LIDAR sensor, etc. In one embodiment, the images may be fused together for a multi-sensor fused perception. Based on measurements from an IMU (the IMU previously calibrated to the sensors) and the captured images, ADV 101 can generate a quaternion that represents a 3D position, and heading information for ADV 101. When calibrated, static obstacles perceived by the perception system of the ADV 101 should appear at the same location. Note, although the follow discloses embodiments for recalibration based on camera images/LIDAR point clouds, the same recalibration implementation can be applied for other images and/or multi-sensor fused images.

In one embodiment, if one or more sensors are no longer aligned to the IMU, the point clouds (or images) perceived will indicate an offset compared with images previously captured by sensors of ADV 101 or other ADVs. In one embodiment, ADV 101 can automatically determine if the misalign is within an acceptable threshold. If not, the ADV 101 sends an alert to an operator of the ADV 101 to recommend and/or to require a recalibration.

Referring to FIGS. 5A-5C, in one embodiment, ADV 101 retrieves point clouds/images mapping a three-dimensional surrounding environment of the ADV based on a location of the ADV (the location determined by GPS/IMU, etc.). The point clouds/images may be retrieved as part of map and route data 311 of FIG. 3A. Next, ADV 101 extracts feature information from the retrieved point clouds. In this case, referring to FIGS. 5A-5C, the feature information may be the orientation/edges/curves/features of obstacles captured by the point clouds/images, e.g., lamp post 501 and traffic sign 502. In one embodiment, a predetermined number of features are selected for extraction. In another embodiment, all features are extracted. In one embodiment, the features are classified as static or dynamic elements based on a classification algorithm and only static elements are selected for extraction (e.g., buildings, trees, traffic signs, lane lines, and lamp post) and where dynamic elements (e.g., vehicles, pedestrians) are not selected for extraction.

Next, based on real-time point clouds/images captured by the ADV 101 which maps a 3D surrounding environment of the ADV 101, ADV 101 extracts features from the real-time point clouds/images, where the features reflect obstacles perceived by ADV (e.g., obstacles 501-502). Here, the obstacles may be perceived by an image recognition algorithm, such as an edge-detection algorithm, a machine learning algorithm, including but not limited to, deep convolutional neural networks. Note, a neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and do not share any connections with other neurons of the layer. A neural network is self-learning and trained, rather than explicitly programmed. A convolutional neural network is a deep neural network with fully connected layers. A fully connected layer is an inner layer having neurons with full connections to all neurons in the previous layer.

In one embodiment, ADV 101 identifies one or more matching features between the extracted feature information of the currently captured point clouds/images and the retrieved point clouds/images mapping the static elements 501-502. Based on the matching features, ADV 101 determines an average offset distance for each of the matching features. The average offset distance can be calculated by averaging the offset distances for all matching features for a planning cycle. In one embodiment, the offset distance for a feature can be calculated based on a distance between the ADV to the extracted features of the previously stored point clouds/images and a distance between the ADV to the extracted features of real-time point clouds/images. In one embodiment, the offset distance is a vectored offset distance (e.g., distance with a x component and a y component for a two-dimensional vector). E.g., the distance from the ADV to the real-time extracted features and the distance from the ADV to the extracted features of retrieved point clouds are vector distances. In one embodiment, the vector distance is a 2D planar distance (e.g., the height is ignored to simplify the calculations).

In one embodiment, based on the average offset distance for a number of planning cycles (or a predetermined time period), ADV 101 generates an average offset distance distribution for the number of planning cycles. Here, the distribution has a sequence of points, and each point is an average offset distance for a given planning cycle. Note, the number of planning cycles can be set to 100 milliseconds (or 1 cycle), 1 minutes, 10 minutes, half an hour, etc. The distribution can then be used to determine if there is a perception sensor misalignment for any sensors capturing the point clouds/images. In one embodiment, the distribution may be discretized to reduce a storage capacity. E.g., the distribution includes a discrete number of bins, and an average offset distance point near a bin is represented by the bin, where each bin is represented by a center value and a range.

In one embodiment, ADV 101 calculates one or more thresholds where the distribution deviates from a zero offset that would trigger an alert. In one embodiment, ADV 101 calculates a mean based on the distribution. The mean can be calculated by averaging the points in the distribution. In one embodiment, a first threshold is one standard deviation, a second threshold is two standard deviations. The standard deviation measures the amount of variation or dispersion of a set of values and can be calculated based on the mean and the set of points in the distribution. In one embodiment, a zero offset within one standard deviation from the mean of the average offset distance distribution does not trigger an alert. In one embodiment, a zero offset more than one standard deviation but less than two standard deviations from the mean of the average offset distance distribution triggers a recommendation alert. In one embodiment, a zero offset more than two standard deviation deviations from the mean of the average offset distance distribution triggers a requirement alert.

In one embodiment, the average offset distance distribution is a vector average offset distance distribution, e.g., the distribution has x components and y components for a 2D planar distribution. In one embodiment, a zero offset within one standard deviation from the mean of both vector components of the distribution does not trigger an alert. In one embodiment, a zero offset more than one standard deviation but less than two standard deviations from the mean for any vector components of the distribution triggers a recommendation alert. In one embodiment, a zero offset more than two standard deviation deviations from the mean for any vector components of the distribution triggers a requirement alert. In one embodiment, the ADV automatically recalibrates by determining an offset vector calculated as an average of each vectored average offset distance distribution component. The offset vector is added to the misaligned sensors readings to compensate for the misalignment. Here, a misaligned sensor introduces a biased offset/error. However, different sensors may include random errors for each reading. The averaging of the offset distances and the generation of a distribution based on the averaged offset distances can highlight the biased offset/error for recalibration determinations.

Figure 5D:
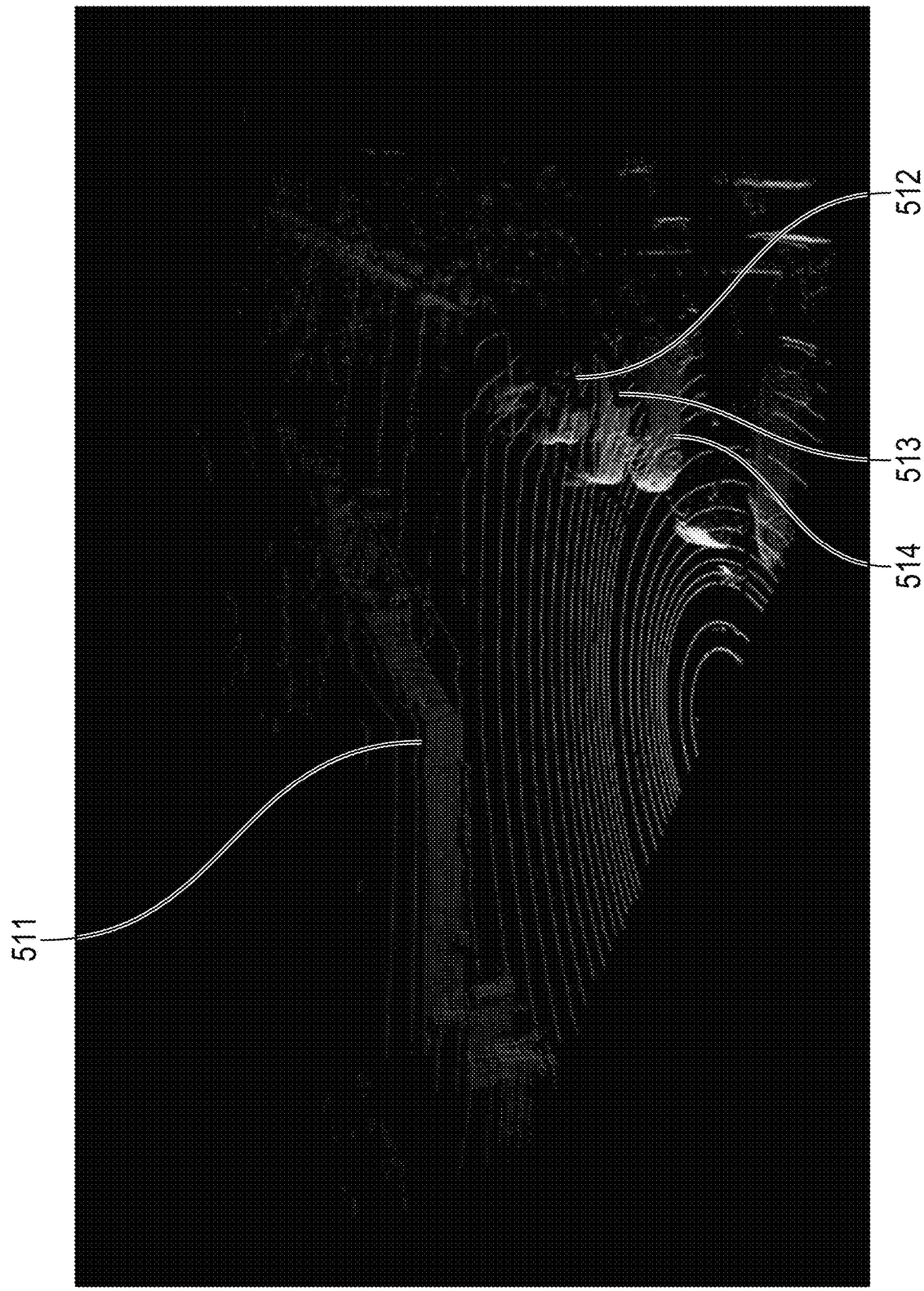
FIG. 5D is a point clouds image illustrating feature information according to one embodiment.

FIG. 5D is a point clouds image illustrating feature information according to one embodiment. Referring to FIG. 5D, features 511 resembles a building which would be classified as a static element using a classification algorithm and features 512-514 resembles vehicles. Here, features 512-514 would be classified as dynamic elements and only features 511 (but not features 512-514) would be extracted and used for feature matching for sensors recalibrations.

FIG. 6A is an example probability density function illustrating an average offset distance distribution according to one embodiment. FIG. 6B is an example probability density function illustrating an average offset distance distribution that triggers a recalibration recommendation alert according to one embodiment. FIG. 6C is an example probability density function illustrating an average offset distance distribution that triggers a recalibration requirement alert according to one embodiment. Referring to FIG. 6A, because a mean for distribution 601 is within a distance of a threshold of one standard deviation from a zero offset, no notification of a sensors recalibration is sent to an operator of the ADV 101. Referring to FIG. 6B, because the zero offset is more than one standard deviation but less than two standard deviations from a mean for distribution 602, ADV 101 sends a first level alert to an operator to recommend a sensors recalibration. Referring to FIG. 6C, because the zero offset is more than two standard deviations from a mean for distribution 603, ADV 101 sends a second level alert to an operator to requisite a sensors recalibration. Although not shown, the two levels of alerts can be any kind of alerts, such as an alert to display a text (e.g., recalibration recommended and/or recalibration required), a color change (yellow and/or red colors), or a combination thereof, onto a dashboard display of the ADV, or a sound/chime, or a touch feedback, etc.

Figure 7:
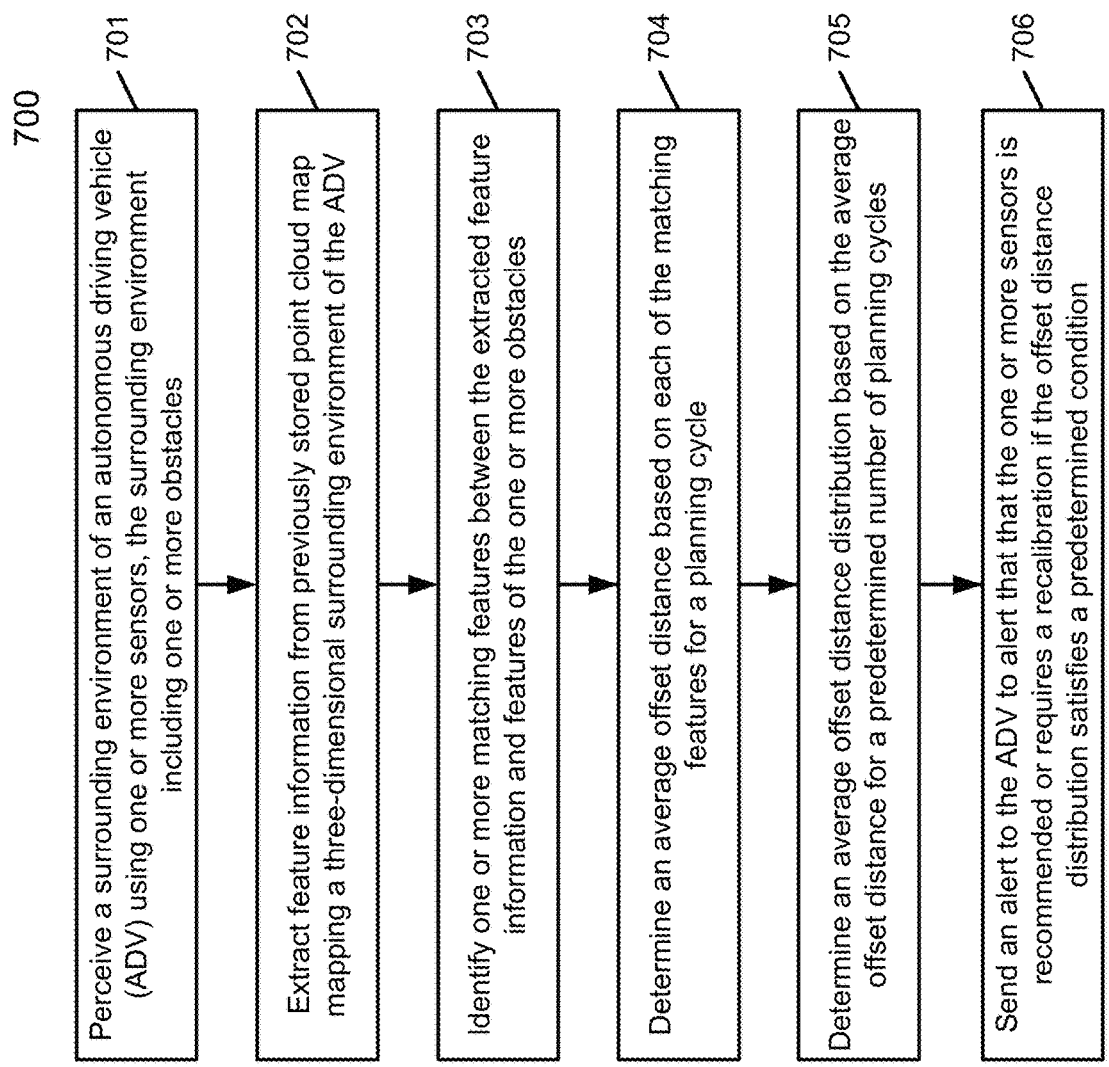
FIG. 7 is a flow diagram illustrating a method according to one embodiment.

FIG. 7 is a flow diagram illustrating a method according to one embodiment. Processing 700 may be performed by processing logic which may include software, hardware, or a combination thereof. For example, process 700 may be performed by sensors calibrate module 308 of FIG. 3A. Referring to FIG. 7, at block 701, processing logic perceives a surrounding environment of an autonomous driving vehicle (ADV) using one or more sensors, the surrounding environment including one or more obstacles. At block 702, processing logic extracts feature information from previously stored point clouds mapping a three-dimensional surrounding environment of the ADV. at block 703, processing logic identifies one or more matching features between the extracted feature information and features of the one or more obstacles. At block 704, processing logic determines an average offset distance based on each of the matching features for a planning cycle (e.g., a cycle of 100 milliseconds). At block 705, processing logic determines an average offset distance distribution based on the average offset distance for a predetermined number of planning cycles (e.g., 10 minutes). At block 706, processing logic sends an alert to the ADV to alert that the one or more sensors is recommended or requires a recalibration if the average offset distance distribution satisfies a predetermined condition.

In one embodiment, the ADV is sent the alert to alert that the one or more sensors is recommended or requires recalibration if a mean of the average offset distance distribution is greater than a threshold distance away from a zero offset. In one embodiment, determining the average offset distance based on each of the matching features for the planning cycle includes: for each of the matching features, determining an offset distance between a feature of the obstacle and its corresponding matching feature, and determining the average offset distance by averaging the determined offset distances for matching features for the planning cycle.

In one embodiment, the offset distance is an offset vector distance. In one embodiment, determining the offset distance from the obstacle and its corresponding matching feature includes determining a first vector distance between the ADV and the feature of the obstacle, determining a second vector distance between the ADV and the corresponding matching feature, and determining the offset distance as a difference vector between the first vector distance and the second vector distance.

In one embodiment, the average offset distance distribution comprises a vector of average offset distance distributions, wherein the operator of the ADV is alerted that the one or more sensors require recalibration if a mean of any vector components of the average offset distance distribution is greater than the threshold distance away from the zero offset for the corresponding vector component. In one embodiment, the threshold distance is approximately two standard deviations.

In one embodiment, the one or more sensors is recalibrated based on the average offset distance distribution so the average offset distance has approximately a zero offset for the predetermined number of planning cycles. In one embodiment, one or more sensors include a light detection and ranging (LIDAR) sensor and an inertial measurement unit (IMU) sensor, wherein the LIDAR sensor is recalibrated with reference to the IMU. In one embodiment, the feature information includes features for static landmarks of the surrounding environment including buildings, traffic signs, lane lines, and lamp post.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to operate an autonomous driving vehicle (ADV), comprising:
   perceiving a surrounding environment of an autonomous driving vehicle (ADV) including one or more obstacles using one or more sensors;
   extracting feature information from previously stored point clouds associated with the surrounding environment of the ADV;
   identifying one or more matching features between the extracted feature information and features of the one or more obstacles perceived by the one or more sensors;
   determining an average offset distance based on each of the matching features for a planning cycle, wherein the planning cycle corresponds to a driving cycle having a predetermined time interval; and
   determining an average offset distance distribution based on the average offset distance for a predetermined number of planning cycles, wherein the predetermined number of planning cycles is greater than 1, wherein the one or more sensors are required a recalibration if the average offset distance distribution satisfies a predetermined condition.

2. The method of claim 1, wherein the one or more sensors are required a recalibration if a mean of the average offset distance distribution is greater than a threshold distance away from a zero offset.

3. The method of claim 2, wherein determining the average offset distance based on each of the matching features for the planning cycle comprises:
   for each of the matching features, determining an offset distance from a feature of the obstacle and its corresponding matching feature; and
   determining the average offset distance by averaging the determined offset distances for matching features for the planning cycle, and
   wherein the one or more sensors include a light detection and ranging (LIDAR) sensor to perceive the surrounding environment and the one or more matching features are identified by comparing features from perceived point clouds and feature information from the previously stored point clouds.

4. The method of claim 3, wherein the offset distance is an offset vector distance.

5. The method of claim 4, wherein determining the offset distance from the feature of the obstacle and its corresponding matching feature comprises:
   determining a first vector distance between the ADV and the feature of the obstacle;
   determining a second vector distance between the ADV and the corresponding matching feature; and
   determining the offset distance as a difference vector between the first vector distance and the second vector distance.

6. The method of claim 5, wherein the average offset distance distribution comprises a vector of average offset distance distributions, wherein an operator of the ADV is alerted that the one or more sensors require recalibration if a mean of any vector components of the average offset distance distribution is greater than the threshold distance away from the zero offset for the corresponding vector component.

7. The method of claim 2, wherein the threshold distance is approximately two standard deviations.

8. The method of claim 2, further comprising recalibrating the one or more sensors based on the average offset distance distribution so subsequent sensors readings have approximately a zero offset.

9. The method of claim 2, wherein the one or more sensors include a light detection and ranging (LIDAR) sensor and an inertial measurement unit (IMU) sensor, wherein the LIDAR sensor is recalibrated with reference to the IMU sensor.

10. The method of claim 1, wherein the feature information includes features for static landmarks of the surrounding environment including buildings, traffic signs, lane lines, and lamp posts.

11. A non-transitory machine-readable medium having instructions stored therein, which when executed by a processor, cause the processor to perform operations, the operations comprising:
   perceiving a surrounding environment of an autonomous driving vehicle (ADV) including one or more obstacles using one or more sensors;
   extracting feature information from previously stored point clouds associated with the surrounding environment of the ADV;
   identifying one or more matching features between the extracted feature information and features of the one or more obstacles perceived by the one or more sensors;
   determining an average offset distance based on each of the matching features for a planning cycle, wherein the planning cycle corresponds to a driving cycle having a predetermined time interval; and determining an average offset distance distribution based on the average offset distance for a predetermined number of planning cycles, wherein the predetermined number of planning cycles is greater than 1, wherein the one or more sensors are required a recalibration if the average offset distance distribution satisfies a predetermined condition.

12. The non-transitory machine-readable medium of claim 11, wherein the one or more sensors are required a recalibration if a mean of the average offset distance distribution is greater than a threshold distance away from a zero offset.

13. The non-transitory machine-readable medium of claim 12, wherein determining the average offset distance based on each of the matching features for the planning cycle comprises:
   for each of the matching features, determining an offset distance from a feature of the obstacle and its corresponding matching feature; and
   determining the average offset distance by averaging the determined offset distances for matching features for the planning cycle, and
   wherein the one or more sensors include a light detection and ranging (LIDAR) sensor to perceive the surrounding environment and the one or more matching features are identified by comparing features from perceived point clouds and feature information from the previously stored point clouds.

14. The non-transitory machine-readable medium of claim 13, wherein the offset distance is an offset vector distance.

15. The non-transitory machine-readable medium of claim 14, wherein determining the offset distance from the feature of the obstacle and its corresponding matching feature comprises:
   determining a first vector distance between the ADV and the feature of the obstacle;
   determining a second vector distance between the ADV and the corresponding matching feature; and
   determining the offset distance as a difference vector between the first vector distance and the second vector distance.

16. A data processing system, comprising:
a processor; and
a memory coupled to the processor to store instructions, which when executed by the processor, cause the processor to perform operations, the operations including
   perceiving a surrounding environment of an autonomous driving vehicle (ADV) including one or more obstacles using one or more sensors,
   extracting feature information from previously stored point clouds associated with the surrounding environment of the ADV,
   identifying one or more matching features between the extracted feature information and features of the one or more obstacles perceived by the one or more sensors,
   determining an average offset distance based on each of the matching features for a planning cycle, wherein the planning cycle corresponds to a driving cycle having a predetermined time interval, and
   determining an average offset distance distribution based on the average offset distance for a predetermined number of planning cycles, wherein the predetermined number of planning cycles is greater than 1, wherein the one or more sensors are required a recalibration if the average offset distance distribution satisfies a predetermined condition.

17. The system of claim 16, wherein the one or more sensors are required a recalibration if a mean of the average offset distance distribution is greater than a threshold distance away from a zero offset.

18. The system of claim 17, wherein determining the average offset distance based on each of the matching features for the planning cycle comprises:
   for each of the matching features, determining an offset distance from a feature of the obstacle and its corresponding matching feature; and
   determining the average offset distance by averaging the determined offset distances for matching features for the planning cycle, and
   wherein the one or more sensors include a light detection and ranging (LIDAR) sensor to perceive the surrounding environment and the one or more matching features are identified by comparing features from perceived point clouds and feature information from the previously stored point clouds.

19. The system of claim 18, wherein the offset distance is an offset vector distance.

20. The system of claim 19, wherein determining the offset distance from the feature of the obstacle and its corresponding matching feature comprises:
   determining a first vector distance between the ADV and the feature of the obstacle;
   determining a second vector distance between the ADV and the corresponding matching feature; and
   determining the offset distance as a difference vector between the first vector distance and the second vector distance.

* * * * *